United States Patent
Parchami et al.

(10) Patent No.: US 12,005,909 B2
(45) Date of Patent: Jun. 11, 2024

(54) VEHICLE ROOF ASSEMBLY

(71) Applicant: Ford Global Technologies, LLC, Dearborn, MI (US)

(72) Inventors: Mostafa Parchami, Ann Arbor, MI (US); Stephen Giardinelli, Ypsilanti, MI (US); John Anthony Lockwood, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 638 days.

(21) Appl. No.: 17/192,992

(22) Filed: Mar. 5, 2021

(65) Prior Publication Data

US 2021/0284180 A1    Sep. 16, 2021

Related U.S. Application Data

(60) Provisional application No. 62/989,156, filed on Mar. 13, 2020.

(51) Int. Cl.
| | |
|---|---|
| *B60W 50/00* | (2006.01) |
| *B60R 11/00* | (2006.01) |
| *B62D 65/02* | (2006.01) |
| *G06N 5/04* | (2023.01) |
| *G06N 20/00* | (2019.01) |

(52) U.S. Cl.
CPC ............. *B60W 50/00* (2013.01); *B60R 11/00* (2013.01); *B62D 65/02* (2013.01); *G06N 5/04* (2013.01); *G06N 20/00* (2019.01); *B60R 2011/004* (2013.01)

(58) Field of Classification Search
None
See application file for complete search history.

(56) References Cited

U.S. PATENT DOCUMENTS

| | | | |
|---|---|---|---|
| 6,384,741 B1 * | 5/2002 | O'Leary, Sr. | H04N 7/183 |
| | | | 348/E7.087 |
| 10,922,574 B1 * | 2/2021 | Tariq | G06V 10/25 |
| 11,206,375 B2 * | 12/2021 | Zuckerman | G06V 10/762 |
| 2011/0106448 A1 | 5/2011 | Widmann et al. | |
| 2019/0303759 A1 | 10/2019 | Farabet et al. | |

FOREIGN PATENT DOCUMENTS

| | | |
|---|---|---|
| CN | 108692733 A | 10/2018 |
| WO | 2019001824 A1 | 1/2019 |

* cited by examiner

*Primary Examiner* — James J Lee
*Assistant Examiner* — David Hatch
(74) *Attorney, Agent, or Firm* — Frank A. MacKenzie; Bejin Bieneman PLC (57) ABSTRACT

A system includes a shaft extendable from a vehicle roof, a sensor mount mounted to the shaft, a plurality of sensors supported by the sensor mount, and a computer communicatively coupled with one or more of the sensors to receive data from the one or more of the sensors, the computer including a processor and a memory. The memory stores instructions executable by the processor to extend the shaft to position the sensor mount to a specified height above the roof.

17 Claims, 7 Drawing Sheets

VEHICLE ROOF ASSEMBLY

CROSS-REFERENCE TO RELATED APPLICATIONS

This patent application claims priority to and all advantages of U.S. Provisional Patent Application 62/989,156, titled "VEHICLE ROOF ASSEMBLY", filed Mar. 13, 2020, which application is hereby incorporated herein by reference in its entirety.

BACKGROUND

Vehicles can be equipped with computers, networks, sensors and controllers to acquire data regarding the vehicle's environment and/or to operate vehicle components. Vehicle sensors can provide data about a vehicle's environment, e.g., concerning routes to be traveled and objects to be avoided in the vehicle's environment. Further, vehicles can receive data from one or more external sources, e.g., a central server, a sensor mounted to infrastructure, etc. To obtain data about a vehicle's environment, i.e., the vehicle's physical surroundings and conditions and/or objects therein, vehicle sensors can be mounted on an external portion of the vehicle, e.g., the roof, trunks lid, bumper(s), etc. An ability of a sensor to obtain data about a vehicle's environment can depend on various factors, e.g., the sensor's field of field of view and the types of data that the sensor can acquire.

DETAILED DESCRIPTION

A system includes a shaft extendable from a vehicle roof, a sensor mount mounted to the shaft, a plurality of sensors supported by the sensor mount, and a computer communicatively coupled with one or more of the sensors to receive data from the one or more of the sensors. The computer includes a processor and a memory, the memory storing instructions executable by the processor to extend the shaft to position the sensor mount to a specified height above the roof.

The shaft can be rotatable from a stowed position to a deployed position.

The instructions can further include instructions to rotate the shaft from the stowed position to the deployed position and, then, to extend the shaft to position the sensor mount to the specified height above the vehicle roof.

The memory can store a plurality of specified geographic locations, each geographic location assigned a respective specified height of the shaft above the vehicle roof.

The instructions can further include instructions to, upon arriving at one of a plurality of specified geographic locations, extend the shaft to the respective specified height assigned to the specified geographic location.

The instructions can further include instructions to collect respective data at each of the specified geographic locations and to train the machine learning program with the data from each of the specified geographic locations.

Each geographic location can be a location of an infrastructure element, and the specified height is a height of an infrastructure sensor.

The sensor mount can be rotatable relative to the shaft.

The instructions further can include instructions to rotate the sensor mount to a specified angle relative to the shaft, the specified angle specified to capture data about a roadway.

The instructions can further include instructions to rotate the sensor mount to a specified rotation angle about the shaft, the specified rotation angle specified to capture data about a roadway.

The shaft can include a base and an extension, the extension extendable from the base to the specified height.

The instructions can further include instructions to train a machine learning program with the received data.

The machine learning program can be trained to output an identified object upon receiving data from one or more of the plurality of sensors.

The instructions can further include instructions to transmit the collected data to an external server to train a machine learning program with the collected data.

A method includes extending a shaft extendable from a vehicle roof of a vehicle to position a sensor mount to a specified height above the vehicle roof, collecting data with one or more sensors supported by the sensor mount, and training a machine learning program with the collected data.

The method can further include rotating the shaft from a stowed position to a deployed position and, then, extending the shaft to position the sensor mount to the specified height above the vehicle roof.

The method can further include collecting respective data at each of a plurality of specified geographic locations and training the machine learning program with the data from each of the specified geographic locations.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Sensors mounted to infrastructure elements can use large amounts of reference data, e.g., annotated images, to train a machine learning program such as a neural network. Such large amounts of reference data may be difficult and/or costly to collect. The machine learning program can identify objects in images collected by the sensors. An infrastructure server can transmit the identified objects to vehicles on a roadway near the infrastructure. Installing an assembly to a vehicle to collect data with sensors of a same kind to those included or to be included on the infrastructure elements can generate the large datasets used to train the machine learning program. The vehicle can move to a plurality of locations at which infrastructure elements are located and can then collect data, e.g., about objects, on a roadway proximate to one or more infrastructure elements (proximate in this context means within a field of view of sensors mounted to an infrastructure element). The data collected by the vehicle at the plurality of locations can provide a plurality of scenarios and objects with which to train the machine learning program, improving output of the machine learning program, and thereby improving operation of an infrastructure server identifying objects to transmit to nearby vehicles.

The assembly installed or mounted to the vehicle can include an extendable shaft that extends the infrastructure sensors to a specified height, i.e., a height at which infrastructure sensors will be mounted to the infrastructure element. Collecting data at the specified height provides data from a field of view of the infrastructure sensors that will be installed to the infrastructure element. That is, the data collected by the infrastructure sensors in the assembly can represent data that would be collected by infrastructure sensors on the infrastructure element rather than simulated data and/or data taken at ground level below where the infrastructure sensors would be installed.

Figure 1:
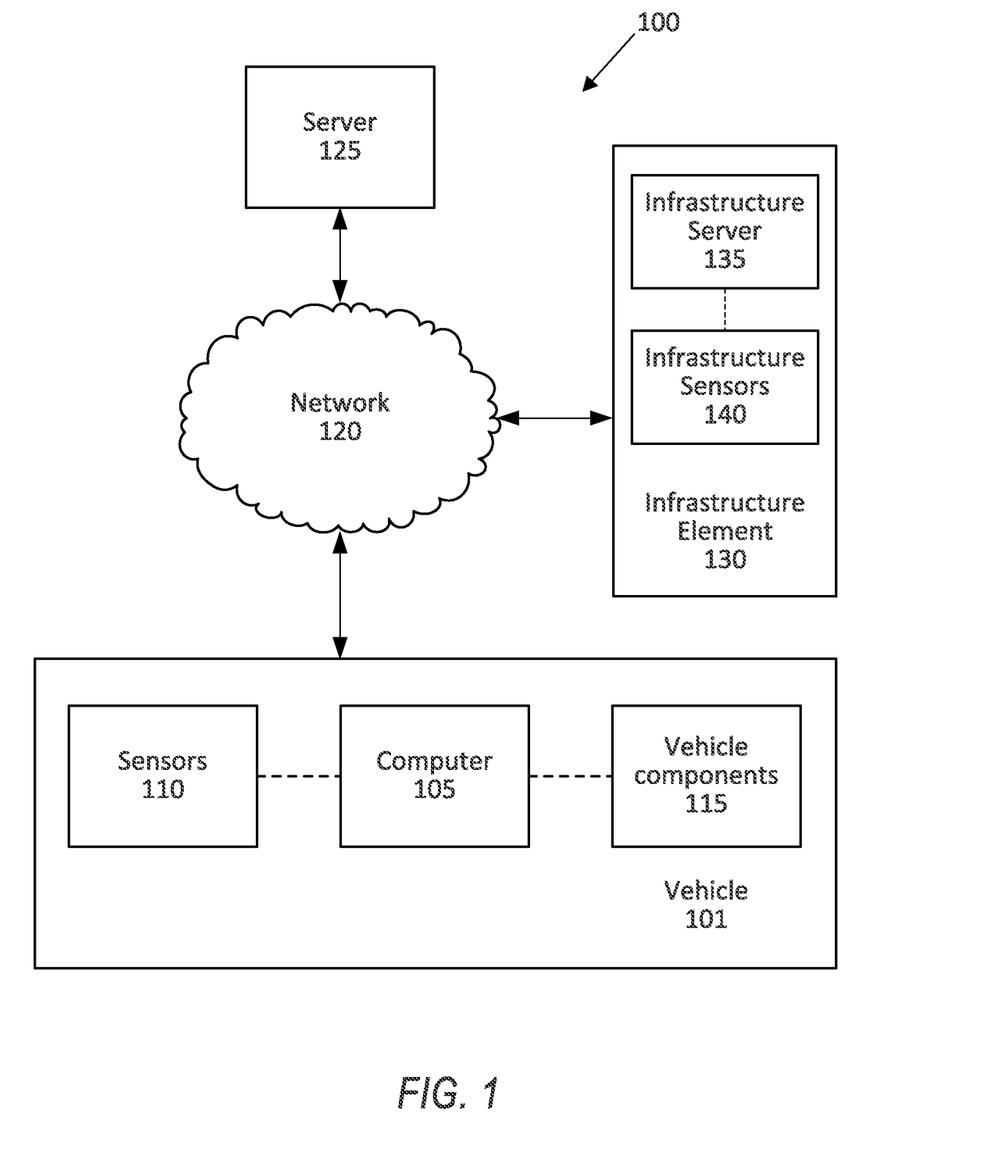
FIG. 1 is a diagram of an example system for collecting data with a vehicle.

FIG. 1 illustrates an example system 100 for collecting data with a vehicle 101. A computer 105 in the vehicle 101 is programmed to receive collected data from one or more sensors 110. For example, vehicle 101 data may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 120, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 110. The memory can be a separate device from the computer 105, and the computer 105 can retrieve information stored by the memory via a network in the vehicle 101, e.g., over a CAN bus, a wireless network, etc. Alternatively or additionally, the memory can be part of the computer 105, e.g., as a memory of the computer 105.

Sensors 110 can include a variety of devices. For example, various controllers in a vehicle 101 may operate as sensors 110 to provide data via the vehicle 101 network or bus, e.g., data relating to vehicle speed, acceleration, position, subsystem and/or component status, etc. Further, other sensors 110 could include cameras, motion detectors, etc., i.e., sensors 110 to provide data for evaluating a position of a component, evaluating a slope of a roadway, etc. The sensors 110 could, without limitation, also include short range radar, long range radar, LIDAR, and/or ultrasonic transducers.

Collected data can include a variety of data collected in a vehicle 101. Examples of collected data are provided above, and moreover, data are generally collected using one or more sensors 110, and may additionally include data calculated therefrom in the computer 105, and/or at the server 125. In general, collected data may include any data that may be gathered by the sensors 110 and/or computed from such data.

The vehicle 101 can include a plurality of vehicle components 115. In this context, each vehicle component 115 includes one or more hardware components adapted to perform a mechanical function or operation-such as moving the vehicle 101, slowing or stopping the vehicle 101, steering the vehicle 101, etc. Non-limiting examples of components 115 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 120 connected to a server 125. The computer 105 can further be programmed to communicate with one or more remote sites such as the server 125, via the network 120, such remote site possibly including a memory. The network 120 represents one or more mechanisms by which a vehicle computer 105 may communicate with a remote server 125. Accordingly, the network 120 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 includes an infrastructure element 130. In this context, an "infrastructure element" is a stationary structure near a roadway such as a pole, a tower, a bridge, a wall, etc. That is, the infrastructure element 130 is fixed to a single location. The infrastructure element 130 includes an infrastructure server 135 and one or more infrastructure sensors 140. The infrastructure server 135 includes a processor and a memory. The infrastructure server 135 can identify objects in the data collected by one or more infrastructure sensors 140. For example, the identified objects can be vehicles 101, pedestrians, cyclists, etc. The infrastructure server 135 can communicate with the computer 105 and the server 125 over the network 120. For example, the infrastructure server 135 can broadcast data to one or more computers 105 in respective vehicles 101 specifying objects identified by the infrastructure sensors.

Figure 2:
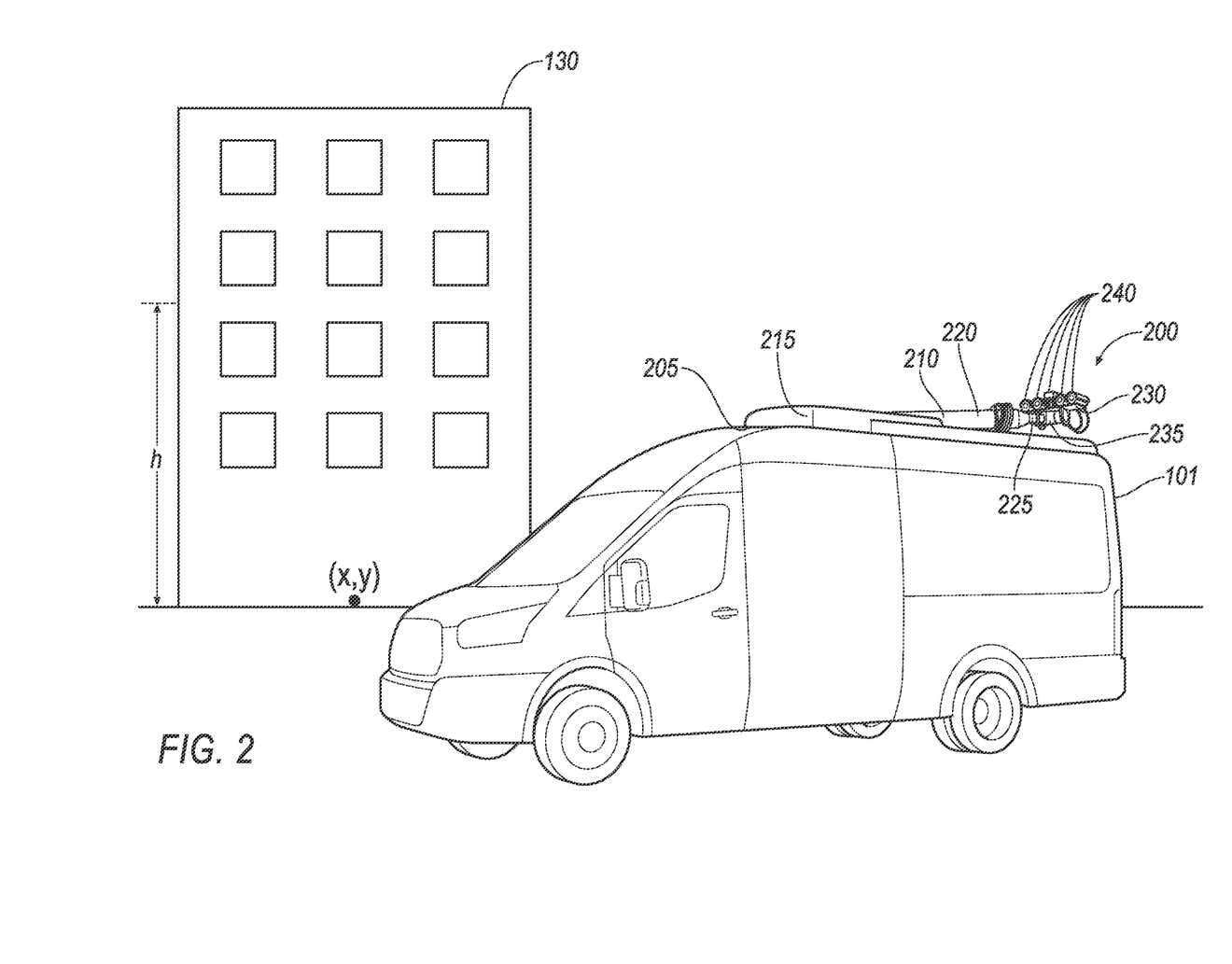
FIG. 2 is a view of an assembly for a vehicle roof.

FIG. 2 is a view of an example vehicle 101. The vehicle 101 is parked near an infrastructure element 130. The server 125 can store for the infrastructure element 130 a specified geographic location x,y at which infrastructure sensor(s) 140 will be mounted. i.e., a geo-coordinate assigned to the sensor(s) 140. The vehicle 101 as illustrated is collecting data to train the infrastructure server 135 to operate infrastructure sensors 140; in this example, the infrastructure sensors 140 are not yet mounted to the infrastructure element 130 and are thus not shown in FIG. 2.

Figure 3:
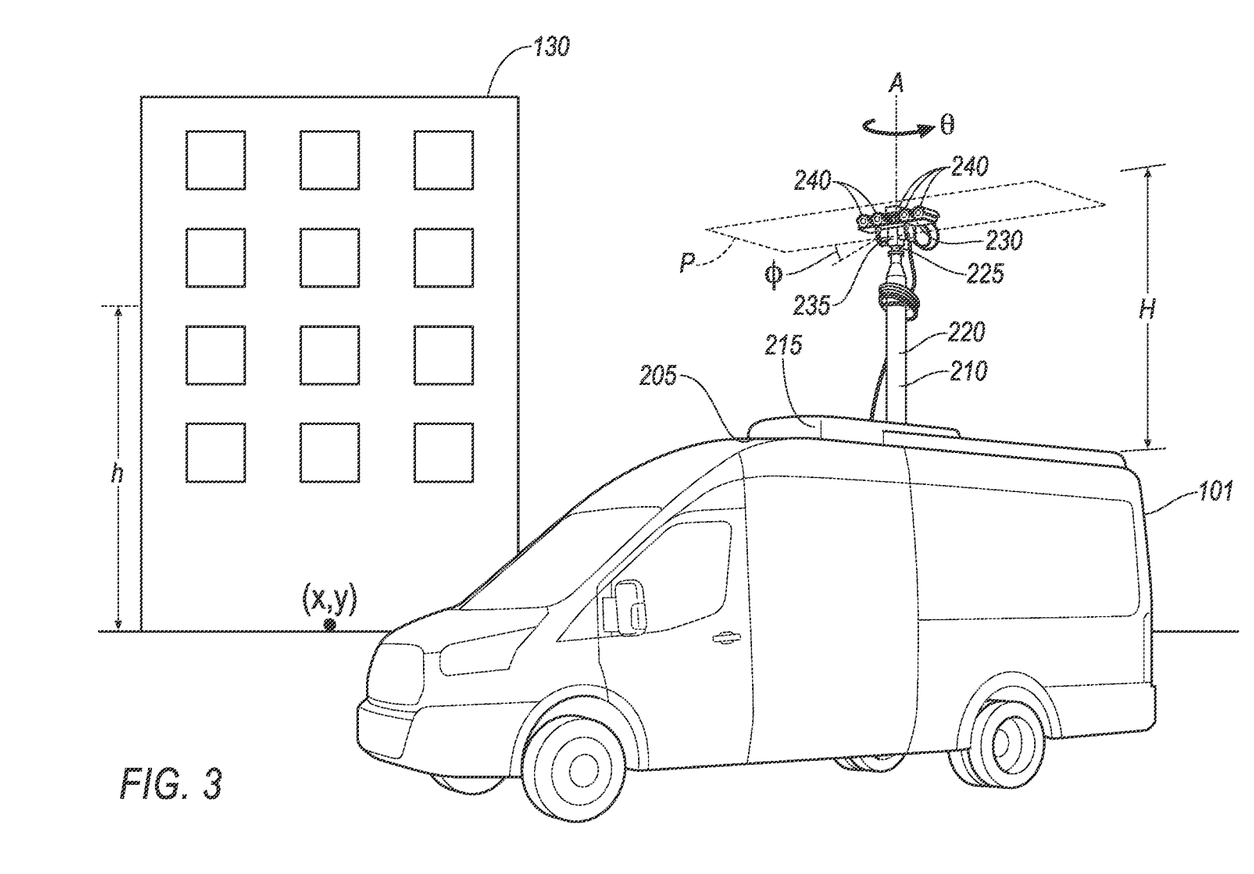
FIG. 3 is a view of the assembly in a deployed position.

The specified geographic location x, y for an infrastructure element 130 is a latitude x and a longitude y in a global coordinate system. For example, FIGS. 2 and 3 illustrate a building infrastructure element 130 to which sensors 140 are mounted at a height h as shown. The point x, y is a point on a ground surface that specifies a geographic location of the sensor(s) 140, i.e., a line perpendicular to the ground would intersect the sensor(s) 140 at the height h. The server 125 can identify a plurality of geographic locations x, y for respective infrastructure elements 130, each geographic location x, y being coordinates, e.g., GPS (Global Positioning System) coordinates or the like. One or more infrastructure sensor(s) 140 can be fixed to the infrastructure element 130 at a specified height (or different respective heights for different sensors 140) above the ground and at a specified orientation to collect data about a roadway.

Figure 4A:
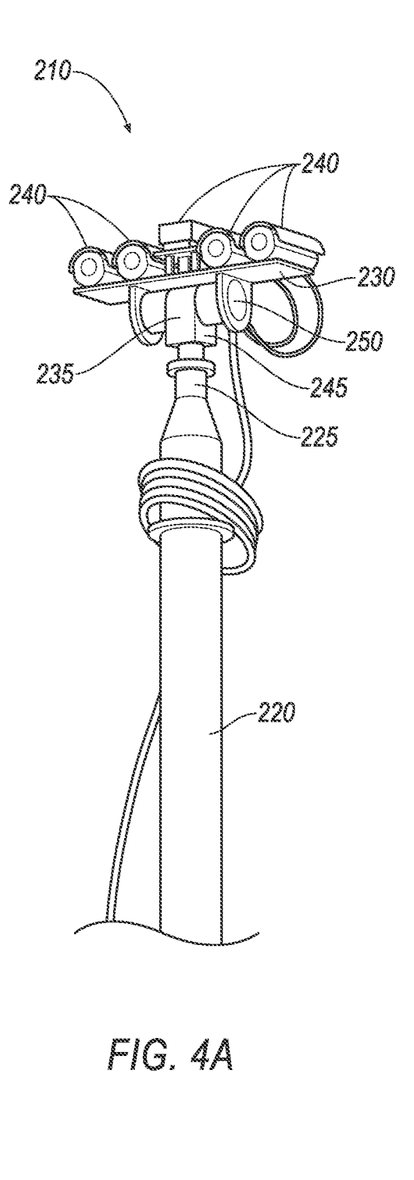
FIGS. 4A-4B are views of a shaft of the assembly.
Figure 4B:
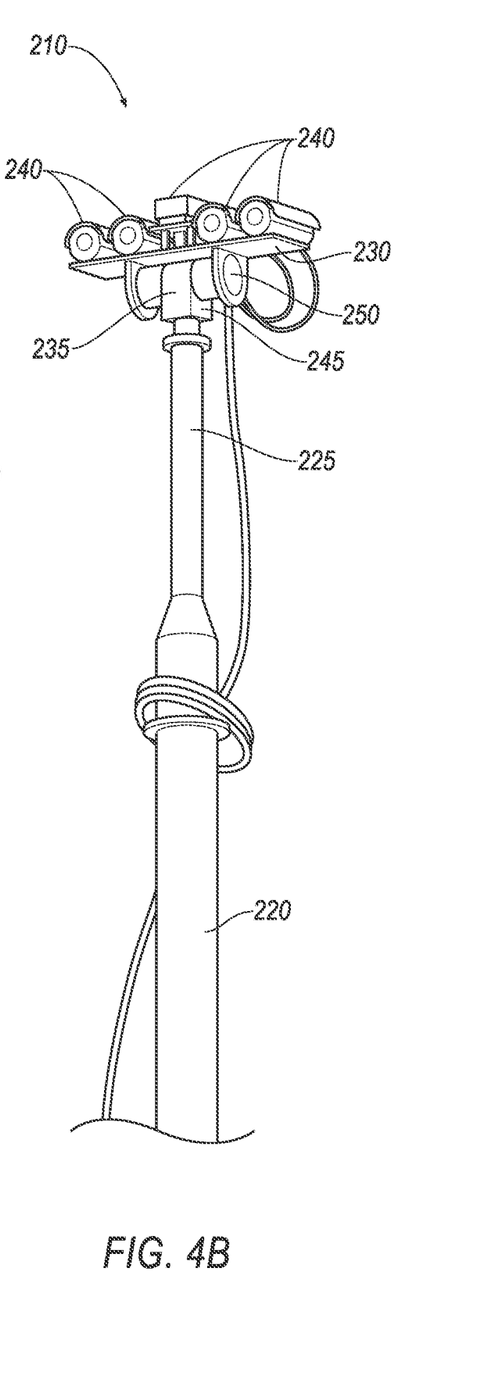

A vehicle 101 can include an assembly 200 for movably supporting sensors to collect data. The assembly 200 is mounted to a roof 205 of the vehicle 101. The roof 205 is a panel supported by one or more vehicle 101 pillars (not shown) that encloses a passenger cabin from above. The roof 205 supports a shaft 210. The shaft 210 can be connected to the roof 205 with a motorized hinge 215. The shaft 210 extends substantially parallel to and/or can be rotated to extend upwardly from the roof 205. The motorized hinge 215 can rotate the shaft 210 relative to the roof 205 about an axis parallel to the roof 205. The motor 215 can rotate the shaft 210 from a stowed position, as shown in FIG. 2, to a deployed position, as shown in FIG. 3. In the "stowed" position, the shaft 210 extends along the roof 205, stowed along the roof 205 to reduce an overall height of the vehicle 101. In the "deployed" position, the shaft 210 extends normal to the roof 205 to raise sensors, described below, to collect data. The shaft 210 further includes a base 220 and an extension 225, as best seen in FIGS. 4A-4B. The extension 225 is extendable from the base 220 to a specified height above the roof 205.

The assembly 200 includes a sensor mount 230 to support sensors 240, described below. The sensor mount 230 is mounted to an end the shaft 210 with a movable mount rotator 235 so that the mount 230 and thus the sensor(s) 240 can be provided with pitch, roll, and yaw movement. That is, the mount rotator 235 includes a base 245 that is rotatably attached to the shaft 210 and a hinge 250 that is mounted to the sensor mount 230, best shown in FIGS. 4A-4B. The rotator 235 also includes one or more conventional, typically electrically powered, motors and/or actuators (not shown) to effect movement as described herein.

The base 245 can rotate about an axis A of the shaft 210, adjusting a yaw angle θ at which the sensors 240 collect data. The hinge 250 can rotate the sensor mount 230 relative to a plane P, as shown in FIG. 2, to adjust a pitch angle of rotation φ. The plane P is a plane at the height of the sensor mount 230 parallel to the roof 205, e.g., the plane P can be defined by a top or bottom surface of the sensor mount 230.

The sensor mount 230 can be a substantially planar object, e.g., a plate, a disc, etc. The mount rotator 235 includes a plurality of motors (not shown), one of which rotates the base 240 and another of which rotates the hinge 250. The mount rotator 235 rotates the sensor mount 230 about the shaft 210 and above and below the plane P to direct the sensors 240 in specified directions to collect data. The mount rotator 235 can rotate the sensor mount 230 about a central axis A of the shaft 210 to a specified rotation (i.e., yaw) angle θ relative to a neutral position, e.g., a longitudinal axis of the vehicle 101. The mount rotator 235 can rotate the sensor mount 230 to a specified pitch angle of rotation φ. That is, the pitch angle φ is defined between the sensor mount 230 and the plane P. The sensor mount 230 can be mounted to the shaft 210 with a mount rotator 235. The mount rotator 235 can rotate the sensor mount 230 to the specified rotation angle θ and the specified pitch angle φ. That is, the mount rotator 235 can include one or more actuators and/or rotators that can rotate the sensor mount 230 upon instruction by the computer 105.

The sensor mount 230 supports a plurality of sensors 240. The sensors 240 are the same type of sensors (a sensor "type" meaning a medium detected by the sensor, e.g., visible light, radio waves, laser light, sound, etc.) as the infrastructure sensors 140 and can include, e.g., cameras, lidar, radar, etc. In the example of FIGS. 2-5, the sensors 240 are cameras, e.g., stereo cameras, monopolarized cameras, CMOS cameras, CCD cameras, etc. That is, the sensors 240 can collect image data about objects on a roadway near the infrastructure element 130. Alternatively or additionally, the sensors 240 can include, e.g., radar, lidar, etc. The computer 105 is communicatively coupled with the sensors 240 via, e.g., the network 125. That is, the computer 105 can provide instructions to the sensors 240, actuating the sensors 240 to collect data, and the computer 105 can receive data collected by the sensors 240 via the communicative coupling.

FIG. 3 is a view of the vehicle 101 with the shaft 210 in the deployed position, as described above. The shaft 210 extends to a specified height H above the roof 205. The height H can be specified by the server 125 as a height at which sensors 240 would be mounted to the infrastructure element 130 at the specified location x, y. The computer 105 can instruct the motor 215 to rotate the shaft 210 to the deployed position. The computer 105 can instruct a linear actuator (not shown in FIG. 3) to move the extension 225 from the base 220 to the specified height H. The computer 105 can instruct the mount rotator 235 to rotate the sensor mount 230 to the specified rotation and pitch angles θ, φ. By extending the shaft 210 to the specified height H, the computer 105 can collect data with the sensors 240 at a same height that sensors 240 would be mounted to the infrastructure element 130. That is, the computer 105 can collect data at a same height as the infrastructure sensors 140 to be installed on the infrastructure element 130, improving data collection compared to data collected with sensors 110 mounted to vehicles 101 that are below the specified height H. By collecting data at specified heights H and angles θ, φ at a plurality of locations x, y, the computer 105 can collect data for a plurality of scenarios, fields of view, and perspectives for infrastructure sensors 140 to be installed at infrastructure elements 130. Because the sensors 240 may not be disposed at an exact location of the infrastructure element 130, the computer 105 can adjust and/or augment the data collected by the sensors 240 based on an offset distance between the height H of the sensors 240 and the position of the infrastructure element 130. For example, the computer 105 and/or the server 125 can use an affine transformation technique that maps the data collected by the sensors 240 at the location at which the data were collected to a coordinate system centered at the mounting location of the infrastructure element 130. The affine transformation technique can be, e.g., a three-dimensional interpolation, a nearest neighbor algorithm, a bilinear transformation, etc.

FIG. 4A is a view of the shaft 210 in a retracted position. In the retracted position, the shaft 210 has a shortest length. That is, as the extension 225 is extended from the base 220, the overall length of the shaft 210 increases. As the extension 225 is retracted toward the base 220, the overall length of the shaft 210 decreases. A linear actuator (not shown) can extend the extension 225 from the base 220.

FIG. 4B is a view of the shaft 210 in an extended position. A linear actuator (not shown) can extend the extension 225 from the base 220, extending the shaft 210 to a specified length. When the shaft 210 is extended to the extended position, the shaft 210 can position the sensor mount 230 at a position to collect data with the infrastructure sensors 240. That is, the shaft 210 is extendable to allow the infrastructure sensors 240 to collect data at a height at which sensors 240 would be installed to the infrastructure element 130.

Figure 5:
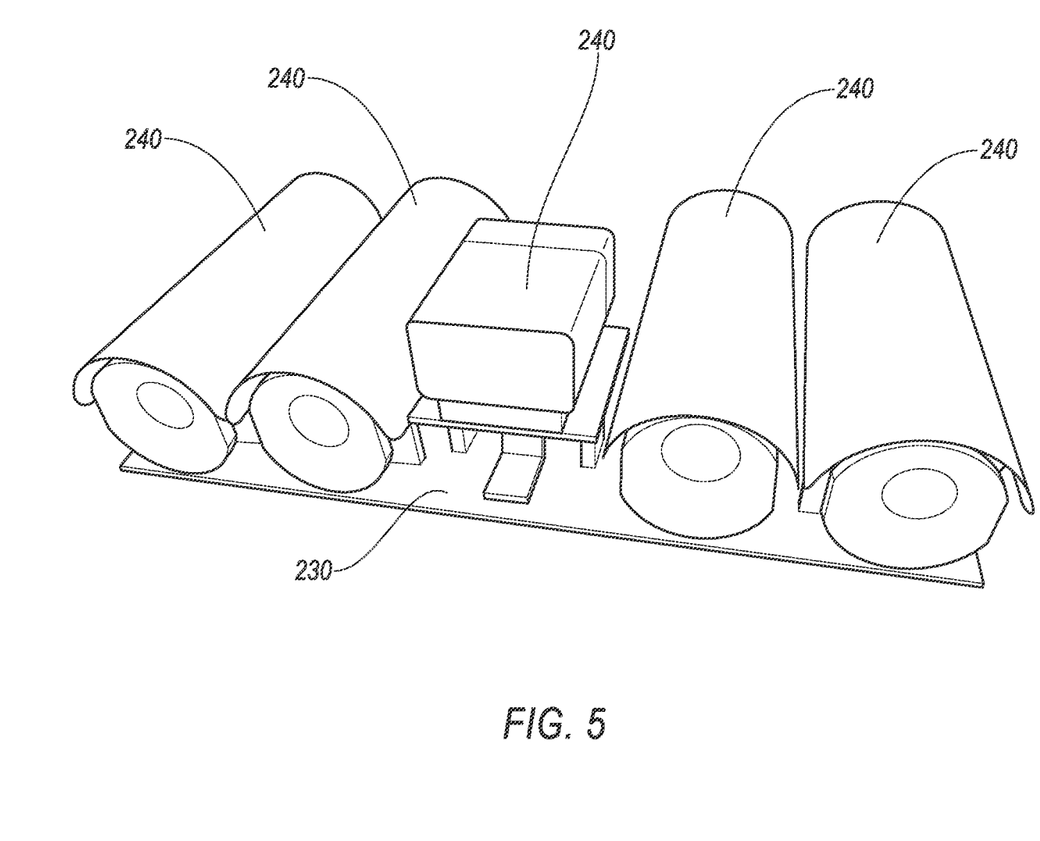
FIG. 5 is a view of the shaft in an extended position.

FIG. 5 is a view of the sensors 240 on the sensor mount 230. The infrastructure sensors 240 can include, e.g., camera, radar, lidar, etc. As described above, in the example of FIGS. 2-5, the sensors 240 are cameras. The sensors 240 collect data to train a machine learning program. The machine learning program can provide output useful for a server 125 and/or the infrastructure server 135 and/or vehicles 101 near the infrastructure element 130. For example, the machine learning program can be an object detection program that detects object (e.g., vehicles 101, pedestrians, cyclists, etc.) on a roadway. The infrastructure server 135 can transmit identified objects to one or more vehicles 101 within a broadcast range of the infrastructure element 130. The sensors 240 can collect data to train the machine learning program. For example, the training data can be data collected by the sensors 240, e.g., images from a camera, point clouds from a lidar, data from a radar, global coordinate data from an external server 125, etc. The images can include objects, e.g., pedestrians, cyclists, other vehicles 101, etc. The data can be annotated, e.g., manually, to label the objects. The annotated data can be reference images input to the machine learning program. The computer 105 and/or the server 125 can train the machine learning program to output detected objects in the images by inputting the collected data to the machine learning program with the annotated objects and minimizing a cost function of the difference between an object identified by the machine learning program and the annotated object in the data, as described below and shown in FIG. 6. When the cost function is minimized, the computer 105 and/or the server 125 can determine that the machine learning program is trained. The infrastructure server 135 can be programmed with the machine learning program and can identify objects on a roadway based on images collected by one or more infrastructure sensors 240.

Figure 6:
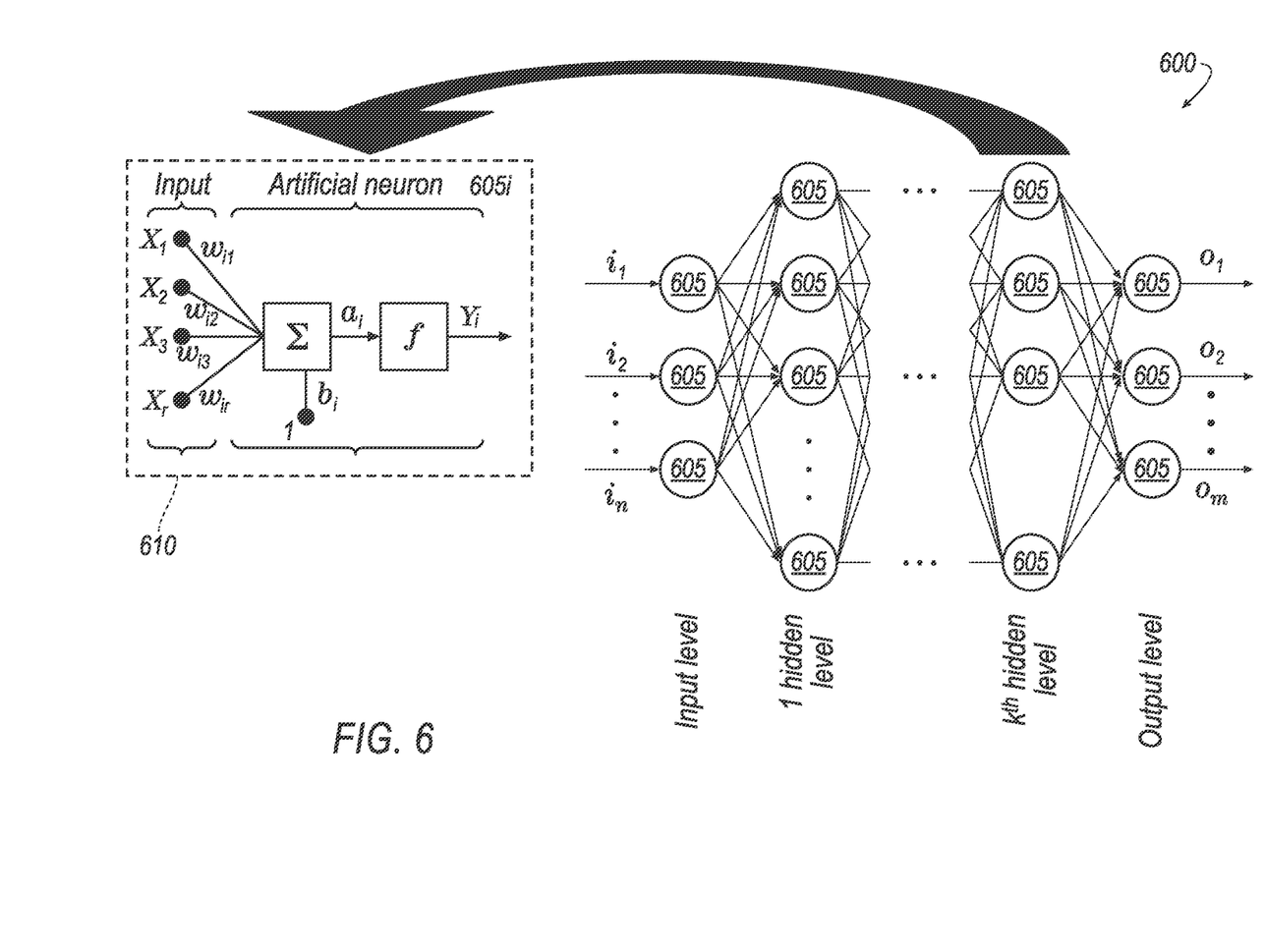
FIG. 6 is a block diagram of an example machine learning program.

FIG. 6 is a diagram of an example machine learning program 600. The machine learning program 600 can be a deep neural network (DNN) 600 that could be trained to identify an object on a roadway. The DNN 600 can be a software program that can be loaded in memory and executed by a processor included in the infrastructure server 135, for example. The DNN 600 can include n input nodes 605, each accepting a set of inputs i (i.e., each set of inputs i can include one or more inputs X). The DNN 600 can include m output nodes (where m and n may be, but typically are not, a same natural number) provide sets of outputs $o_1 \ldots o_m$. The DNN 600 includes a plurality of layers, including a number k of hidden layers, each layer including one or more nodes 605. The nodes 605 are sometimes referred to as artificial neurons 605, because they are designed to emulate biological, e.g., human, neurons. The neuron block 610 illustrates inputs to and processing in an example artificial neuron 605i. A set of inputs $X_1 \ldots X_r$ to each neuron 605 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 605i output $Y_i$. The activation function $f$ can be a variety of suitable functions, typically selected based on empirical analysis. As illustrated by the arrows in FIG. 6, neuron 605 outputs can then be provided for inclusion in a set of inputs to one or more neurons 605 in a next layer.

The DNN 600 can be trained to accept as input data, e.g., data from the sensors 240 mounted to the sensor mount 230, and to output one or more parameters for identifying an object. For example, the DNN 600 could be trained to output an identification of a pedestrian, a cyclist, and/or a vehicle 101 on a roadway near the infrastructure element 130. That is, the DNN 600 can be trained with ground truth data, i.e., data about a real-world condition or state. Weights w can be initialized by using a Gaussian distribution, for example, and a bias b for each node 605 can be set to zero. Training the DNN 600 can including updating weights and biases via conventional techniques such as back-propagation with optimizations.

A set of weights w for a node 605 together are a weight vector for the node 605. Weight vectors for respective nodes 605 in a same layer of the DNN 600 can be combined to form a weight matrix for the layer. Bias values b for respective nodes 605 in a same layer of the DNN 600 can be combined to form a bias vector for the layer. The weight matrix for each layer and bias vector for each layer can then be used in the trained DNN 600.

In the present context, the ground truth data used to train the DNN 600 could include image data from the sensors 240 annotated to identify the objects in the images. For example, the sensor 240 can collect a plurality of images that can be annotated and then be labeled for training the DNN 600, i.e., tags can be specified identifying the objects, such as just described, in the images. The DNN 600 can then be trained to output data values that correlate to the objects, and the output data values can be compared to the annotations to identify a difference, i.e., a cost function of the output data values and the input annotated images. The weights w and biases b can be adjusted to reduce the output of the cost function, i.e., to minimize the difference between the output data values and the input annotated images. When the cost function is minimized, the server 125 can determine that the DNN 600 is trained.

Figure 7:
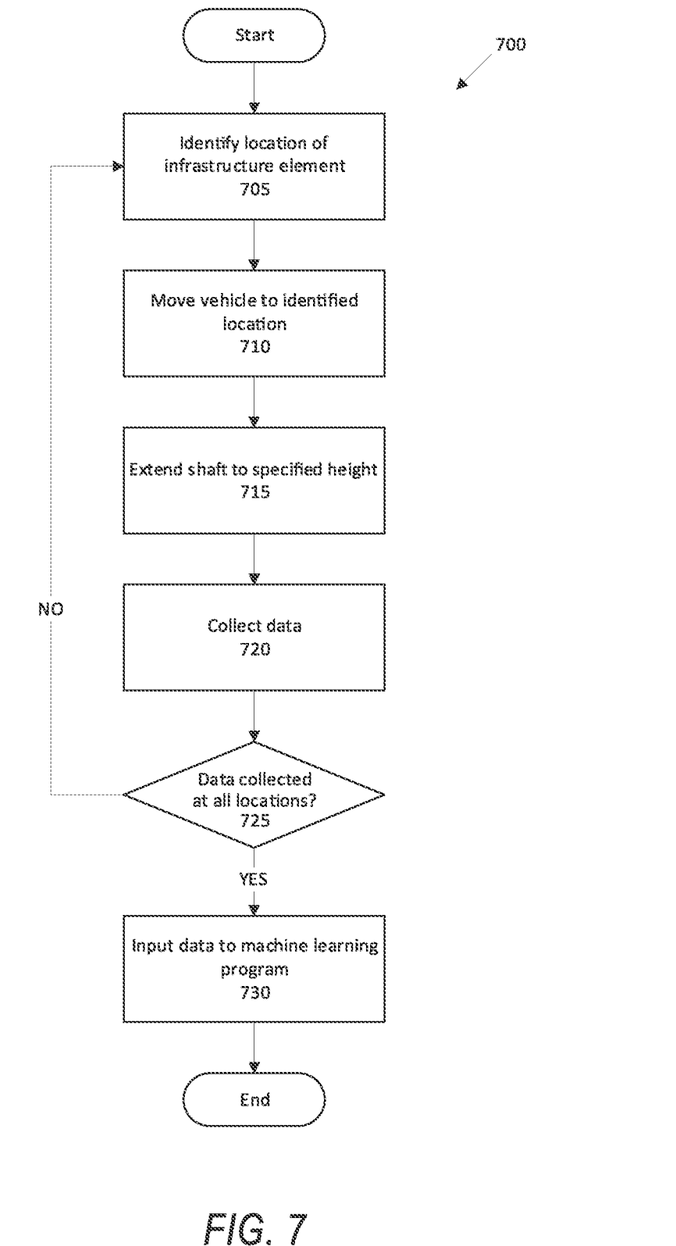
FIG. 7 is a diagram of an example process for collecting data with the vehicle.

FIG. 7 is a diagram of an example process 700 for collecting data with a vehicle 101. The process 700 begins in a block 705, in which a computer 105 in the vehicle 101 identifies a location x, y of an infrastructure element 130. The location x, y is a latitude x and a longitude y in a global coordinate system. As described above, the computer 105 can receive a plurality of locations x, y of infrastructure elements 130 from a server 125. The infrastructure elements 130 can be locations at which infrastructure sensors 240 will be installed to identify objects on a roadway.

Next, in a block 710, the computer 105 moves the vehicle 101 to the identified location x, y. The computer 105 can actuate one or more components 115 to move the vehicle 101 to the infrastructure element 130 at the identified location x, y. For example, the computer 105 can actuate a propulsion, a brake, and a steering to move the vehicle 101 to the identified location x, y.

Next, in a block 715, the computer 105 extends a shaft 210 to a specified height H above a vehicle roof 205. The computer 105 can instruct a motor 215 to move the shaft 210 from a stowed position to a deployed position. The computer 105 can then instruct a linear actuator to move an extension 225 along a base 220 until a sensor mount 230 reaches the specified height H. The specified height H can be a height at which infrastructure sensors 240 will be installed to the infrastructure element 130. The computer 105 can actuate a mount rotator 235 to rotate the sensor mount 230 to a specified rotation angle θ and a specified pitch angle φ, as described above.

Next, in a block 720, the computer 105 actuates one or more infrastructure sensors 240 supported by the sensor mount 230 to collect data. The infrastructure sensors 240 can collect, e.g., image data, radar data, lidar data, etc. The computer 105 can instruct the mount rotator 235 to rotate the sensor mount 230 to a plurality of rotation and pitch angles θ, φ to collect data at different orientations relative to the shaft 210. The data at different rotation and pitch angles θ, φ can improve training of a machine learning program by providing additional reference data and additional scenarios from which the machine learning program can identify objects.

Next, in a block 725, the computer 105 determines whether data has been collected at all locations identified by the server 125. The server 125 can provide a plurality of locations, each location including a respective infrastructure element 130. When the computer 105 collects data at each of the plurality of locations, the computer 105 collects data for each infrastructure element 130 identified by the server 125. If the computer 105 determines that data has been collected for all locations, the process 700 continues in a block 730. Otherwise, the process 700 returns to the block 705 to move to the next location.

In the block 730, the computer 105 and/or the server 125 inputs the collected data into the machine learning program to train the machine learning program. As described above, the computer 105 and/or the server 125 can annotate the collected data with identified objects and input the annotated data as reference data to the machine learning program. The computer 105 and/or the server 125 can train the machine learning program with the reference data by minimizing a cost function of a difference between an object identified by the machine learning program and the annotated object in the reference data. As described above, the machine learning program can be a deep neural network 600 that optimizes a cost function that outputs a difference between an annotated object in training data and an object identified by the deep neural network 600. Following the block 730, the process 700 ends.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising:
a shaft extendable from a vehicle roof;
a sensor mount mounted to the shaft;
one or more sensors supported by the sensor mount; and
a computer communicatively coupled with one or more of the sensors to receive data from the one or more of the sensors, and including a processor and a memory, the memory storing instructions executable by the processor to:

extend the shaft to position the sensor mount to a specified height above the roof, wherein the specified height is a height based on a geographic location.

2. The system of claim 1, wherein the shaft is rotatable from a stowed position to a deployed position.

3. The system of claim 2, wherein the instructions further include instructions to rotate the shaft from the stowed position to the deployed position and, then, to extend the shaft to position the sensor mount to the specified height above the vehicle roof.

4. The system of claim 1, wherein the memory stores a plurality of specified geographic locations including the geographic location, and wherein each of the plurality of geographic locations is assigned a respective specified height of the shaft above the vehicle roof.

5. The system of claim 4, wherein the instructions further include instructions to collect respective data at each of the specified geographic locations and to train the machine learning program with the data from each of the specified geographic locations.

6. The system of claim 4, wherein each of the specified geographic locations is a location of an infrastructure element, and the respective specified height is a height of an infrastructure sensor associated with the respective specified geographic location.

7. The system of claim 1, wherein the sensor mount is rotatable relative to the shaft.

8. The system of claim 7, wherein the instructions further include instructions to rotate the sensor mount to a specified angle relative to the shaft, the specified angle specified to capture data about a roadway; wherein the specified angle is in a plane that includes the shaft.

9. The system of claim 7, wherein the instructions further include instructions to rotate the sensor mount to a specified rotation angle about the shaft, the specified rotation angle specified to capture data about a roadway; wherein the specified angle is in a plane that does not include the shaft.

10. The system of claim 1, wherein the shaft includes a base and an extension, the extension extendable from the base to the specified height.

11. The system of claim 1, wherein the instructions further include instructions to train a machine learning program with the received data.

12. The system of claim 11, wherein the machine learning program is trained to output an identified object upon receiving data from one or more of the plurality of sensors.

13. The system of claim 1, wherein the instructions further include instructions to transmit the collected data to an external server to train a machine learning program with the collected data.

14. A method, comprising:

extending a shaft extendable from a vehicle roof of a vehicle to position a sensor mount to a specified height above the vehicle roof;

collecting data with one or more sensors supported by the sensor mount, including respective data at each of a plurality of specified geographic locations; and training a machine learning program with the collected data, including with the data from each of the specified geographic locations, wherein each of the geographic locations is assigned a respective specified height of the shaft above the vehicle roof.

15. The method of claim 14, further comprising rotating the shaft from a stowed position to a deployed position and, then, extending the shaft to position the sensor mount to the specified height above the vehicle roof.

16. The method of claim 14, wherein each geographic location is a location of an infrastructure element, and the respective specified height is a height of a set of infrastructure sensors.

17. The method of claim 14, wherein the machine learning program is trained to output an identified object upon receiving data from the one or more sensors.

* * * * *